United States Patent [19]

Raevsky

[11] Patent Number: 5,104,917
[45] Date of Patent: Apr. 14, 1992

[54] HEAT ABLATIVE COMPOSITIONS

[75] Inventor: Vitaly G. Raevsky, Cherry Hill, N.J.

[73] Assignee: Ad-Va-Cote Tri-State Inc., Cinnamnson, N.J.

[21] Appl. No.: 387,251

[22] Filed: Jul. 31, 1989

Related U.S. Application Data

[63] Continuation-in-part of Ser. No. 229,060, Aug. 5, 1988, abandoned.

[51] Int. Cl.$^5$ .......................... C08K 3/24; C08K 3/28; C08L 7/00; C08L 95/00
[52] U.S. Cl. ..................................... 524/71; 524/423; 106/210; 106/600
[58] Field of Search ............................ 524/59, 71, 423; 106/38.3, 85, 210, 600

[56] References Cited

U.S. PATENT DOCUMENTS

| | | | |
|---|---|---|---|
| 1,248,092 | 11/1917 | D'Rohan | 106/18.22 |
| 2,132,969 | 10/1938 | Rau | 106/18.21 |
| 2,142,116 | 1/1939 | Cupery | 106/18.21 |
| 2,414,660 | 1/1947 | Nikitin | 106/18 |
| 2,676,162 | 4/1954 | Marotta | 252/606 |
| 2,935,471 | 5/1960 | Aarons et al. | 106/18.22 |
| 2,948,641 | 8/1960 | McCluer | 106/18.23 |
| 3,455,850 | 7/1969 | Saunders | 252/606 |
| 3,714,084 | 1/1973 | Botc | 260/9 |
| 3,916,057 | 10/1975 | Hatch et al. | 252/606 |
| 3,934,066 | 1/1976 | Murch | 428/276 |
| 4,034,079 | 7/1977 | Schoonman | 424/83 |
| 4,104,426 | 8/1978 | Gonzalez et al. | 428/288 |
| 4,122,059 | 10/1978 | Hansen | 260/89 |
| 4,123,557 | 10/1978 | Epstein et al. | 426/105 |
| 4,133,823 | 1/1979 | Joyce, III et al. | 260/439 R |
| 4,166,743 | 9/1979 | Wortmann et al. | 252/606 |
| 4,173,666 | 11/1979 | Quinto | 428/288 |
| 4,176,071 | 11/1979 | Crouch | 252/602 |
| 4,198,328 | 4/1980 | Bertelli et al. | 252/606 |
| 4,198,493 | 4/1980 | Marciandi | 252/606 |
| 4,206,133 | 6/1980 | Joyce, III et al. | 252/606 |
| 4,209,335 | 6/1980 | Katayama et al. | 106/89 |
| 4,235,836 | 11/1980 | Wassell et al. | 252/602 |
| 4,247,332 | 1/1981 | Kinoshita et al. | 106/18.16 |
| 4,259,401 | 3/1981 | Chahroudi et al. | 428/306 |
| 4,260,542 | 4/1981 | Joyce, III et al. | 106/18.12 |
| 4,262,364 | 4/1981 | Fujita | 455/192 |
| 4,313,761 | 2/1982 | Joyce, III et al. | 106/18.19 |
| 4,324,835 | 4/1982 | Keen | 428/305.5 |
| 4,374,171 | 2/1983 | McCarter | 428/109 |
| 4,425,998 | 1/1984 | Hof et al. | 428/920 |
| 4,446,061 | 5/1984 | Joyce, III et al. | 252/602 |
| 4,462,831 | 7/1984 | Raevsky et al. | 106/18.26 |
| 4,514,326 | 4/1985 | Sallay | 252/602 |
| 4,632,865 | 12/1986 | Tzur | 106/18.21 |
| 4,671,896 | 6/1987 | Hasegawa et al. | 259/609 |
| 4,714,642 | 12/1987 | McAliley et al. | 428/109 |
| 4,729,853 | 3/1988 | von Bonin | 252/602 |
| 4,743,644 | 5/1988 | Skipper et al. | 524/437 |
| 4,788,231 | 11/1988 | Smigerski et al. | 523/334 |
| 4,795,776 | 1/1989 | Milner | 523/386 |
| 4,806,162 | 2/1989 | Ladang | 524/437 |

FOREIGN PATENT DOCUMENTS 2079294 1/1982 United Kingdom ................ 524/423

OTHER PUBLICATIONS

Chemical Abstracts, 74/15503t.
Chemical Abstracts, 82/61219t.
Chemical Abstracts, 86/31125z.
Chemical Abstracts, 87/33072z.
Chemical Abstracts, 88/26901m.
Chemical Abstracts, 92/95113a.
Chemical Abstracts, 93/133410a.
Chemical Abstracts, 93/172636y.
Chemical Abstracts, 94/35415g.
Chemical Abstracts, 107/179354w.
American Society for Testing and Materials: Standard Method of Fire Test of Through-Penetration Fire Stops, ASTM E 814-83, (May 27, 1983).
American Society for Testing and Materials: Standard Methods of Fire Testing for Building Construction and Materials, ASTM E 119-83, (Mar. 25, 1983).

Primary Examiner—Allan M. Lieberman

[57] ABSTRACT

Heat ablative compositions, comprises a binder and a filler including a combination of aluminum sulfate hydrate and aluminum ammonium sulfate hydrate. The combination produces a synergistic effect on the fire protection rating of the composition. The binder may be chosen from inorganic or organic binders.

15 Claims, 2 Drawing Sheets

HEAT ABLATIVE COMPOSITIONS

CROSS-REFERENCE TO RELATED APPLICATION

This is a continuation-in-part of co-pending U.S. patent application Ser. No. 229,060, filed Aug. 5, 1988, now abandoned.

FIELD OF THE INVENTION

The invention relates to heat ablative compositions, particularly heat ablative compositions comprising a binder and a filler including hydrated inorganic salts.

BACKGROUND OF THE INVENTION

Heat ablative compositions utilizing a binder and a filler consisting of aluminum sulfate hydrate are known. See U.S. Pat. No. 4,462,831 and U.K. Patent Application No. 2,079,294.

Heat ablative compositions are the most effective type of heat-isolative materials for intense heat ranging from 700° to 1500° C., for example, heat due to fire. Whereas conventional heat isolative materials protect by insulating, heat ablative compositions protect by absorbing heat as a result of physical and chemical endothermic degradation of the binder and filler. The endothermic degradation absorbs practically all the heat applied to the composition up to the moment when the composition is exhausted. For example in U.S. Pat. No. 4,462,831, endothermic degradation occurs when the aluminum sulfate hydrate is dehydrated.

Heat ablative compositions utilize a number of processes to protect against heat. The following is an illustrative list of such processes, and is not meant to be all-inclusive:
1. Chemical destruction of the binder;
2. The absorbtion of heat caused by the liberation of water molecules from the hydrated inorganic salt, i.e., heat of dehydration;
3. The absorbtion of heat caused by the evaporation of the liberated water molecules, i.e., heat of evaporation;
4. Foam formation in the ablative composition;
5. The flow of yielding gases out of the ablative composition, which carries heat away from the composition; and
6. Color change of the ablative composition to white, which reflects heat.

Absorbtion of heat of dehydration and absorbtion of heat of evaporation by hydrated inorganic salts involve the loss of water of hydration. The temperature at which the heat absorbtion occurs is typically about 100° C., the boiling point of water. Thus, heat ablative compositions containing hydrated inorganic salts absorb heat once the composition reaches a temperature of about 100° C. The temperature of the composition remains at approximately 100° C. until all water is driven off.

The efficiency of ablative compositions is characterized by the elapsed time between the initiation of heating of the composition and the point at which the composition reaches a given maximum temperature. This efficiency rating is known in art as the "Fire Protective Rating" (F.P.R.), and is measured in, for instance, minutes. The American Society of Testing Materials (ASTM) has standardized the testing procedure for determining F.P.R. in ASTM E-119 and ASTM E-814.

One type of filler used in ablative composition is an inorganic hydrated salt, aluminum sulfate hydrate, $Al_2(SO_4)_3 \cdot 14\text{-}18H_2O$. See U.S. Pat. No. 4,462,831. A filler consisting solely of aluminum sulfate hydrate, however, has certain deficiencies. Aluminum sulfate hydrate is highly acidic, containing about 48.5% sulfate ions. Its efficacy is greatest when the water of crystallization is maximized. Moreover, aluminum sulfate hydrate has a tendency to dehydrate during storage.

The acidic character of aluminum sulfate hydrate has numerous consequences on the performance of the heat ablative composition. The acidity may cause the destruction of the binder, which results in decreased F.P.R.'s. Aluminum sulfate hydrate's acidity may also result in cracking, brittleness and total loss of impact resistance of the binder, and loss of tensile strength, compressive strength or bending strength in the finished ablative product. The excess acidity may result in erosion or destruction by oxidation of the substructure to which the ablative composition is applied.

Aluminum sulfate hydrate is most effective when the molar ratio of water to aluminum sulfate is 18 to 1. As the ratio drops from 18:1 to 14:1, the F.P.R. decreases by as much as one fourth or more. Moreover, aluminum sulfate hydrate having a water to sulfate ratio of 18:1 is not commercially available. As a general rule commercially available aluminum sulfate hydrate has a water to sulfate ratio between 14 and 14.5 to 1.

The term "aluminum sulfate hydrate", as used herein, refers to compounds having the general formula $Al_2(SO_4)_3 \cdot nH_2O$ wherein n is from 14 through 18, inclusive.

Aluminum ammonium sulfate hydrate ($AlNH_4(SO_4)_2 \cdot 12H_2O$) is also useful as a filler in ablative compositions. Its most significant disadvantage is its low F.P.R. However, it has a somewhat lower acidic character than aluminum sulfate hydrate, by virtue of a lower sulfate ion content (42.4% v. 48.5%). Aluminum ammonium sulfate hydrate has a greater stability than aluminum sulfate hydrate, and a more constant water of crystallization. Moreover, it is readily available, generally at inexpensive cost.

SUMMARY OF THE INVENTION

Heat ablative compositions according to the present invention comprise a binder and a filler including a combination of aluminum sulfate hydrate and aluminum ammonium sulfate hydrate. The combination generally produces a synergistic effect on the F.P.R. of the composition. Preferably, the filler comprises no more than about 90% by weight of the entire composition. The binder may be chosen from inorganic or organic binders.

DETAILED DESCRIPTION OF THE INVENTION

Figure 1:
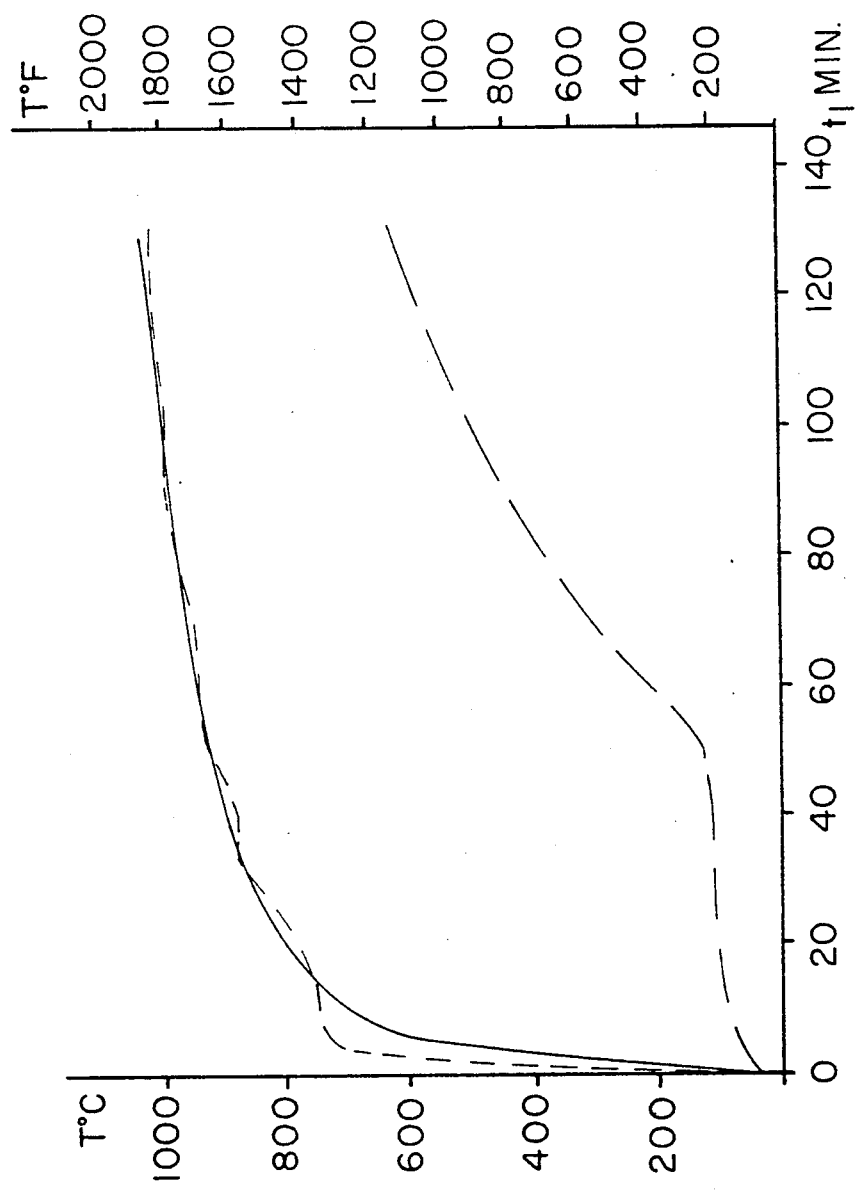
FIGS. 1 and 2 are graphs illustrating the increase in temperature of articles formed from various heat ablative compositions as a function of the time interval over which heat is applied to the articles.

For the purpose of illustrating the invention, there is shown in the figures experimental data concerning the invention. However, this invention is not limited thereto.

The ablative compositions according to the invention comprise a binder in combination with a filler, which filler includes a combination of aluminum sulfate hydrate and ammonium aluminum sulfate hydrate. Preferably, the filler comprises no more than about 90% by weight of the entire composition. Filler added to the binder in excess of about 90% tends to reduce the composition's strength. Preferably, the composition contains at least about 70% by weight of the filler, because less than about 70% filler may cause a drop in the F.P.R.

The most preferred formulation for the composition includes, on a weight percentage of the entire composition basis, from about 10% to about 30% binder; from about 50% to about 75%, most preferably from about 50% to about 65%, aluminum sulfate hydrate; and from about 5% to about 40% aluminum ammonium sulfate hydrate.

The binder may be chosen from any organic or inorganic binders. "Binder", as used herein, means a vehicle which contains the filler and enables the composition to be used for heat protective devices. Binders include, but are not limited to, natural rubber, any of the various synthetic rubbers, unsaturated polyesters, urea-formaldehyde, polypropylene, polyvinyl chloride, and the like. The binder may comprise combinations of materials, such as, for example, natural rubber in combination with bitumen, or natural rubber in combination with ethylenepropylene terpolymer, a terpolymer elastomer made from ethylene, propylene, and small amounts of a non-conjugated diene. Ethylene-propylene terpolymer is more commonly known as "EPT" OR "EPDM" or "EPDM rubber".

As used herein, "bitumen" means hydrocarbon mixtures, occurring in nature or as residues from petroleum distillation. As a group, the bitumens comprise complex mixtures of paraffinic, aromatic and naphthenic hydrocarbons.

As used herein, "natural rubber" means the rubber product derived from natural sources, e.g., the latex of Hevea trees, which predominantly comprises polyisoprene.

Aluminum sulfate hydrate has as many as 14 to 18 water molecules of hydration, and may be added to the composition as an aqueous solution, i.e. about 45% water. The aluminum ammonium sulfate hydrate includes about 12 water molecules.

The compositions according to the invention have F.P.R.'s generally 6-10 times greater than conventional heat isolative materials, for example, ceramic foam or gypsum board. The compositions of the invention have F.P.R.'s generally 5-30% greater than compositions including either aluminum sulfate hydrate or aluminum ammonium sulfate hydrate alone.

The compositions may be prepared by combining the components in any suitable manner, utilizing any of the available mixing devices suitable for combining filler and binder materials.

According to one embodiment of the invention, all the ingredients making up the novel composition are mixed together until a substantially homogenous mass is obtained. The mixing process can be carried out in any type of apparatus, known to those skilled in the art, which does not require heating the ingredients to a temperature which decomposes the aluminum sulfate hydrate (86.5° C.). Examples of such mixing devices include roll mills and Banbury mixers. After the mixing process, the resulting mass has aluminum sulfate hydrate and aluminum ammonium sulfate hydrate embedded into the matrix of the binder.

A solution comprising aluminum sulfate may be employed when preparing the compositions of the invention. In this instance, the aluminum sulfate may be mixed with the binder. The hydrated salt is formed in its required form (i.e., powder) by a controlled drying process. This results in simultaneously embedding the aluminum sulfate hydrate powder into the matrix of the binder.

Another approach for preparing the novel compositions of the invention is to prepare the aluminum sulfate hydrate in situ by reacting two or more reagents which will produce the hydrate.

The compositions disclosed herein, when applied to a substructure, protect the substructure from intense heat. The compositions may be formed into various shapes depending upon the binder chosen, as illustrated hereinafter. Furthermore, the final products may be reinforced with cloth, fabric or metal wire, or may be fabricated into composite materials.

The following is a listing of illustrative, preferred formulations for various heat ablative compositions made according to the invention. The percentages are by weight of the entire composition, unless otherwise noted.

Composition 1

12.8% natural rubber (SMR-20, Herman Weber Co., Inc.); 3.2% EPDM rubber (Buna AP 447, Bayer); 1.0% aromatic oil; 0.6% chlorinated paraffin (Cereclor 52, ICI); 64% aluminum sulfate hydrate (powder, approximately 100 mesh); 18.4% aluminum ammonium sulfate hydrate (powder, approximately 100 mesh). The ingredients of the composition may be mixed in a Banbury mixer or two-roll rubber mill. The finished product, preferably in the form of sheets, rolled material or composites, may be produced by calendering, pressing or extrusion. The composition is used for coating walls, profiles, panels and the like. The F.P.R. (up to 170° C.) of an 8 mm specimen is about 70 minutes.

Composition 2

11.7% natural rubber (SMR-20); 2.8% bitumen (411, "bitum" type, melting point 70°-90° C.); 64.0% aluminum sulfate hydrate; 21.5% aluminum ammonium sulfate hydrate. The method of mixing of ingredients, and the formation of finished products, are as set forth in Composition 1 above. The F.P.R. (up to 170° C) of an 8 mm specimen is about 63 minutes.

Composition 3

15.5% amorphus polypropylene; 1.0% aromatic oil; 64% aluminum sulfate hydrate; 19.5% aluminum ammonium sulfate hydrate. The ingredients may be mixed in a Banbury mixer, or in a two-roll rubber mill. The finished product, preferably in the form of sheets, rolled material, granules or composites, may be produced by calendering, pressing, extrusion pressing or injection molding. The products may be used for pipes and cable jackets. The F.P.R. (up to 170° C.) of an 8 mm specimen is about 60 minutes.

Composition 4

7.0% polyvinyl chloride; 3.2% dioctyl phthalate; 2% tricresyl phosphate; 1.0% cyclohexanone; 1.0% dibutyl adipinate; 64% aluminum sulfate hydrate; 21.8% aluminum ammonium sulfate hydrate. The composition is prepared by mixing the ingredients in a propeller-type mixer. The finished product, preferably in the form of small articles or plates, is formed by pressing. The F.P.R. (up to 170° C.) of a 8 mm specimen is about 63 minutes.

Composition 5

23.62% unsaturated polyester; 0.71% methyl ethyl ketone peroxides; 0.07% cobalt naphthenate (promoter); 64% aluminum sulfate hydrate; 11.60% aluminum ammonium sulfate hydrate. The ingredients are mixed together immediately prior to use, as the composition is a thermosetting material which will cure at room temperature. The finished product may be press-molded, vibration-formed or cast. The F.P.R. (up to 170° C.) of an 8 mm specimen is about 55 minutes.

Composition 6

36% urea formaldehyde liquid resin (CAR-54, Carmel, Ltd.); 1.75% water; 0.12% ammonium chloride (powder, approximately 100 to 200 mesh); 63.0% aluminum sulfate hydrate; 11.77% aluminum ammonium sulfate hydrate. The ingredients are mixed together immediately prior to use, as the composition is a thermosetting material which will cure at room temperatures. The finished product may be press molded, vibration-formed or cast. The F.P.R. (up to 170° C.) of an 8 mm specimen is about 65 minutes.

Composition 7

The following three compositions, identified in Table 1 as compositions 7a, 7b and 7c, are two-component systems, which, when mixed together, form a thixotropic liquid or paste which can be applied by spraying or troweling. The material may be press-molded or vibration-formed. The F.P.R. (up to 170° C.) of an 8 mm specimen is about 60 minutes.

were mixed together in a two roller rubber mill. The resulting composition was pressed into specimen plates of 6, 8 and 10 mm in thickness. The specimen plates were then tested in accordance with ASTM E-119. The increase in temperature as a function of the duration of applied heat is represented as a temperature v. time curve. In FIG. 1, the results from the test of the 6 mm specimen are shown. Plot 1 is a temperature-time curve specified in ASTM E-119. Plot 2 is the actual temperature-time curve of the oven used for the instant test. Plot 3 is a temperature-time curve of the side of the specimen not exposed to the oven's heat. Plot 3 clearly indicates a plateau over the range of 90° C. to 120° C., between 10 and 50 minutes. The plateau is attributable to the endothermic processes. The 8 mm specimen had a similar plateau between 10 and 60 minutes. The 10 mm specimen's plateau was between 70–80 minutes. The time it took the unexposed side of the 6 mm specimen to reach 1,000° F. (538° C.), i.e. the F.P.R. (up to 538° C.), was 102 minutes. The 8 mm and 10 mm specimens had F.P.R.'s (up to 538° C.) of 115 and 127 minutes, respectively.

By way of comparison, 6 mm and 10 mm specimens of ceramic foam, a conventional heat-isolating material, were tested, according the ASTM E-119. The 6 mm specimen had an F.P.R. (up to 538° C.) of only 10 minutes. The 10 mm specimen had an F.P.R. (up to 538° C.) of only 17 minutes. The temperature v. time curve of neither specimen displayed a plateau. Also for comparison, compositions of 18% natural rubber (SMR-20) and (i) 82% aluminum sulfate hydrate, and (ii) 18% natural rubber and 82% aluminum ammonium sulfate hydrate, were prepared and pressed into 6 mm specimens, in accordance with the above procedure. Their respective F.P.R.'s (up to 538° C.) were (i) 95 minutes and (ii) 67 minutes.

TABLE 1

| COMPONENTS (wt. %) | COMPOSITION | | | | | | | | |
|---|---|---|---|---|---|---|---|---|---|
| | 7a | | | 7b | | | 7c | | |
| | A | B | A + B | A | B | A + B | A | B | A + B |
| Urea formaldehyde resin | 86.5 | — | 20.6 | 87.0 | — | 20.7 | 87.0 | — | 20.7 |
| Water glass (sodium silicate) | 7.5 | — | 1.8 | 8.0 | — | 1.9 | 8.0 | — | 1.9 |
| Starch (corn) | 1.5 | — | 0.3 | 1.5 | — | 0.3 | 1.5 | — | 0.3 |
| Aerosil 200 (or 300) | 1.5 | 1.2 | 1.3 | 1.5 | 1.2 | 1.31 | 1.5 | 1.0 | 1.16 |
| Water | 3.0 | — | 0.7 | 2.0 | — | 0.5 | 2.0 | — | 0.5 |
| $Al_2(SO_4)_3$ $16H_2O$ powder | — | 35.0 | 26.7 | — | 37.0 | 28.2 | — | 34.9 | 29.55 |
| $NH_4 Al(SO_4)_2$ $12H_2O$ powder | — | 10.5 | 8.0 | — | 13.0 | 9.9 | — | 10.3 | 8.70 |
| $Al_2(SO_4)_3$ ca 45% wtr. solution | — | 50.0 | 38.1 | — | 47.0 | 35.81 | — | 50.2 | 34.44 |
| $NH_4$ Cl, powder | — | 1.2 | 0.9 | — | 1.2 | 0.91 | — | 1.1 | 0.84 |
| Urea granules | — | 0.6 | 0.47 | — | 0.6 | 0.47 | — | — | — |
| Oxalic acid | — | 0.3 | 0.23 | — | — | — | — | 2.5 | 1.91 |
| Asbestos | — | 1.2 | 0.9 | — | — | — | — | — | — |
| TOTAL | 100 | 100 | 100 | 100 | 100 | 100 | 100 | 100 | 100 |
| A:B by weight | 1:3.2 | (23.8:76.2%) | | 1:3.2 | (23.9:76.2%) | | 1:3.2 | (23.8:76.2%) | |
| Pot Life* | 1.5 ± 0.5 hours | | | 7 ± 1 hours | | | 0.5 – 1 min | | |
| Consistency before hardening | Medium viscosity thixotropic paste | | | | | | Thixotropic liquid for spray of filling | | |

*"Pot Life" means the amount of time between mixing and curing.

The invention is further illustrated in the following non-limiting examples. All quantities are in terms of weight percentage, based upon the total weight of the composition, unless noted otherwise. In some examples, comparative examples of compositions outside the scope of the invention are presented, and are so noted.

EXAMPLE 1

18% natural rubber (SMR-20), 20% aluminum ammonium sulfate hydrate (powdered, 100 mesh), and 62% aluminum sulfate hydrate (powdered, 100 mesh)

EXAMPLE 2

15% natural rubber (SMR-20), 2% bitumen, 60% aluminum sulfate hydrate and 23% aluminum ammonium sulfate hydrate were mixed together and tested as outlined in Example 1, except that the composition was allowed to harden at room temperature for two weeks. The 6 mm specimen had a F.P.R. (up to 538° C.) of 87 minutes.

By way of comparison, compositions comprising the same binder of Example 2 (15% natural rubber and 2% bitumen) and either (i) 83% aluminum sulfate hydrate, or (ii) 83% aluminum ammonium sulfate hydrate, were prepared and tested. The respective F.P.R.'s (up to 538° C.) were (i) 80 minutes and (ii) 62 minutes.

EXAMPLE 3

22% unsaturated polyester (No. 555, Fiberplast, Ltd.), 2% methyl ethyl ketone peroxide (curing agent), 2% cobalt naphtenate (promoter), 60% aluminum sulfate hydrate and 14% aluminum ammonium sulfate hydrate are mixed together with a propeller mixer. The F.P.R. (up to 538° C.) of a 6 mm specimen was 88 minutes.

By way of comparison, compositions comprising the same binder of Example 3 (unsaturated polyester, methyl ethyl ketone and cobalt naphtenate) and either (i) 74% aluminum sulfate hydrate, or (ii) 74% aluminum ammonium sulfate hydrate, were prepared and tested. The respective F.P.R.'s (up to 538° C.) were (i) 84 minutes and (ii) 68 minutes.

EXAMPLE 4

23% urea-formaldehyde liquid resin (CAR-54; Carmel. Ltd.), 1% hardener (ammonium chloride), 60% aluminum sulfate hydrate and 16% aluminum ammonium sulfate hydrate were mixed together, resulting in a two-component thermosetting material which cures at room temperature. The F.P.R. (up to 538° C.) of a 6 mm specimen was about 92 minutes.

By way of comparison, compositions comprising the same binder of Example 4 (urea-formaldehyde liquid resin and ammonium chloride) and either (i) 76% aluminum sulfate hydrate, or (ii) 76% aluminum ammonium sulfate hydrate, were prepared and tested. The respective F.P.R.'s (up to 538° C.) were (i) 89 minutes and (ii) 72 minutes.

EXAMPLE 5

16% amorphous polypropylene, 64% aluminum sulfate hydrate and 20% aluminum ammonium sulfate hydrate were mixed together. An F.P.R. (up to 538° C.) of 93 minutes was determined for a 6 mm specimen.

By way of comparison, compositions comprising 16% amorphous polypropylene and either (i) 84% aluminum sulfate hydrate, or (ii) 84% aluminum ammonium sulfate, were prepared and tested. The respective F.P.R.'s (up to 538° C.) were (i) 88 minutes and (ii) 70 minutes.

EXAMPLE 6

13% natural rubber (SMR-20), 5% EPDM rubber, 20% aluminum ammonium sulfate hydrate and 62% aluminum sulfate hydrate were mixed together as set forth in Example 1. The composition was pressed into a specimen having a depth of 6.5 mm (0.4") and an area of 400 mm×400 mm (16" by 16"). The specimen was tested to determine the F.P.R. up to 230° C. (445° F.) in accordance with the ASTM E-814. The F.P.R. was 84 minutes, or 13 minutes per mm of thickness.

Figure 2:
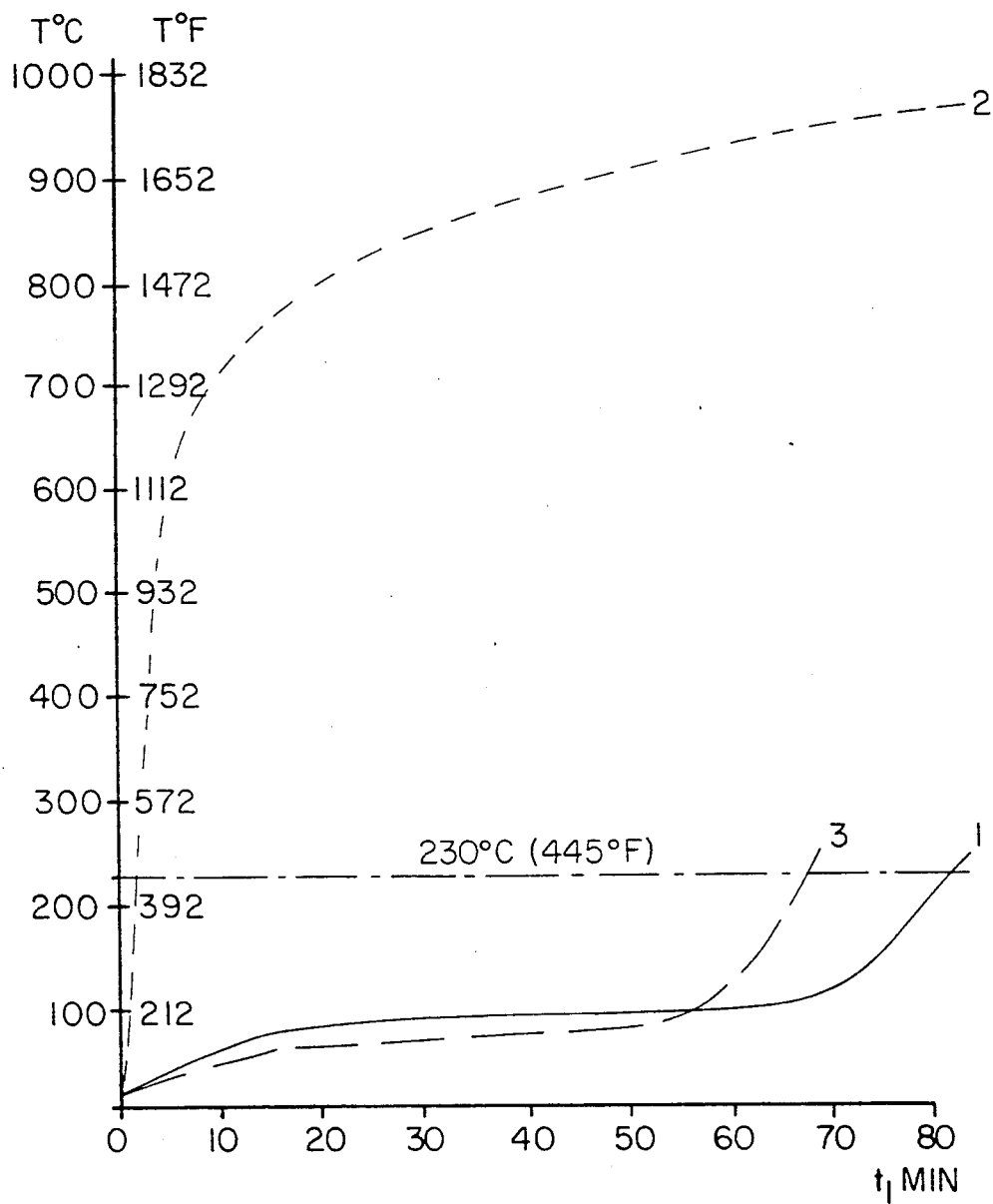

The temperature v. time profile of the Example 6 composition is illustrated in FIG. 2 as Plot 1. Plot 2 of the same figure is the temperature v. time profile specified in ASTM E-119.

By way of comparison, a conventional heat-isolated building material, fire proof gypsum board (sheet rock) having a 16 mm (⅝th inch) thickness, was tested in accordance with ASTM E-814. The F.P.R. (up to 230° C.) was 27 minutes, or 1.7 minutes per mm of thickness.

EXAMPLE 7

23.5% urea-formaldehyde liquid resin (CAR-54, Carmel Ltd.), 0.5% hardener (ammonium chloride), 63% aluminum sulfate hydrate and 13% aluminum ammonium sulfate hydrate were mixed and coated to a thickness of 4.5 mm onto a plate of gypsum board having the following dimensions: 400 mm×400 mm×16 mm. The specimen was tested to determine the F.P.R. (up to 230° C.) in accordance with ASTM E814. The F.P.R. was 67 minutes. Plot 3 of FIG. 2 comprises the temperature v. time profile of the specimen.

The specimen prepared as set forth in Example 7 was again tested to determine the F.P.R. up to 230° C., but in an oven at a constant temperature of 900° C. (about 1700° F.). The F.P.R. was 34 minutes. By way of comparison, a ⅝th inch specimen of gypsum board tested under the same conditions displayed an F.P.R. up to 230° C. of only 15 minutes.

EXAMPLE 8

74.6% aluminum sulfate hydrate, 8.4% aluminum ammonium sulfate hydrate, and 17% natural rubber (SMR-20). The resulting composition was formed into sheets of 4 mm and 8 mm thickness, and subjected to a small-scale disk test. After thermocouples were connected to the samples, the latter were placed in a furnace pre-heated to 800° C.±20° C. The time elapsed from the insertion of the samples into the furnace, until the samples reached a temperature of 170° C., was recorded (hereinafter "heat protection time"). The 4 mm and 8 mm samples displayed heat protection times of 19±1 minutes and 37±2 minutes, respectively, corresponding to the approximate heat protection time measured for samples of the same thickness prepared according to Example 7 of U.S. Pat. No. 4,462,381 (80% aluminum sulfate hydrate). Thus, in this instance, reduction of the amount of aluminum sulfate hydrate in the composition, and its replacement with aluminum ammonium sulfate hydrate, did not lead to a decrease in heat protection time. However, the composition of the invention has increased stability over the prior art composition, as a result of its lesser acidity.

The present invention may be embodied in other specific forms without departing from the spirit or essential attributes thereof and, accordingly, reference should be made to the appended claims, rather than to the foregoing specification, as indicating the scope of the invention.

I claim:

1. An ablative composition comprising:
   (a) a binder and
   (b) a filler comprising aluminum sulfate hydrate and aluminum ammonium sulfate hydrate, wherein said filler comprises from about 70% to about 90% by weight of said composition and the ratio of aluminum sulfate hydrate to aluminum ammonium sulfate hydrate is from about 5:4 to about 15:1.

2. An ablative composition according to claim 1 wherein the binder comprises an organic binder.

3. An ablative composition according to claim 2 wherein the binder comprises a material selected from the group of natural and synthetic rubbers.

4. An ablative composition according to claim 2 wherein the binder comprises .the combination of a rubber and a bitumen.

5. An ablative composition according to claim 2 wherein the binder comprises polyvinyl chloride.

6. An ablative composition according to claim 1 wherein the binder comprises one or more polyesters.

7. An ablative composition according to claim 1 wherein the binder comprises urea-formaldehyde.

8. An ablative composition according to claim 1 comprising, by weight of the composition:
- from about 10% to about 30% of the binder;
- from about 50% to about 75% by weight aluminum sulfate hydrate; and
- from about 5% to about 40% by weight aluminum ammonium sulfate hydrate.

9. An ablative composition according to claim 8 wherein the binder comprises an organic binder.

10. An ablative composition according to claim 9 wherein the binder comprises a material selected from the group of natural and synthetic rubbers.

11. An ablative composition according to claim 9 wherein the binder comprises the combination of a rubber and a bitumen.

12. An ablative composition according to claim 9 wherein the binder comprises polyvinyl chloride.

13. An ablative composition according to claim 9 wherein the binder comprises one or more polyesters.

14. An ablative composition according to claim 9 wherein the binder comprises urea-formaldehyde.

15. An ablative type composition comprising:
(a) a binder, wherein said binder comprises from about 10 to about 30 weight percent of the composition, and
(b) a filler, wherein said filler comprises from about 70 to about 90 weight percent of said composition, and wherein from about 50 to about 65 percent of said filler comprises aluminum sulfate hydrate and from about 5 to about 40 weight percent of said filler comprises aluminum ammonium sulfate hydrate.

* * * * *